Nov. 24, 1964  R. A. DORA ET AL  3,158,019
CHROMATOGRAPHIC ANALYZER
Filed July 16, 1962  2 Sheets-Sheet 1
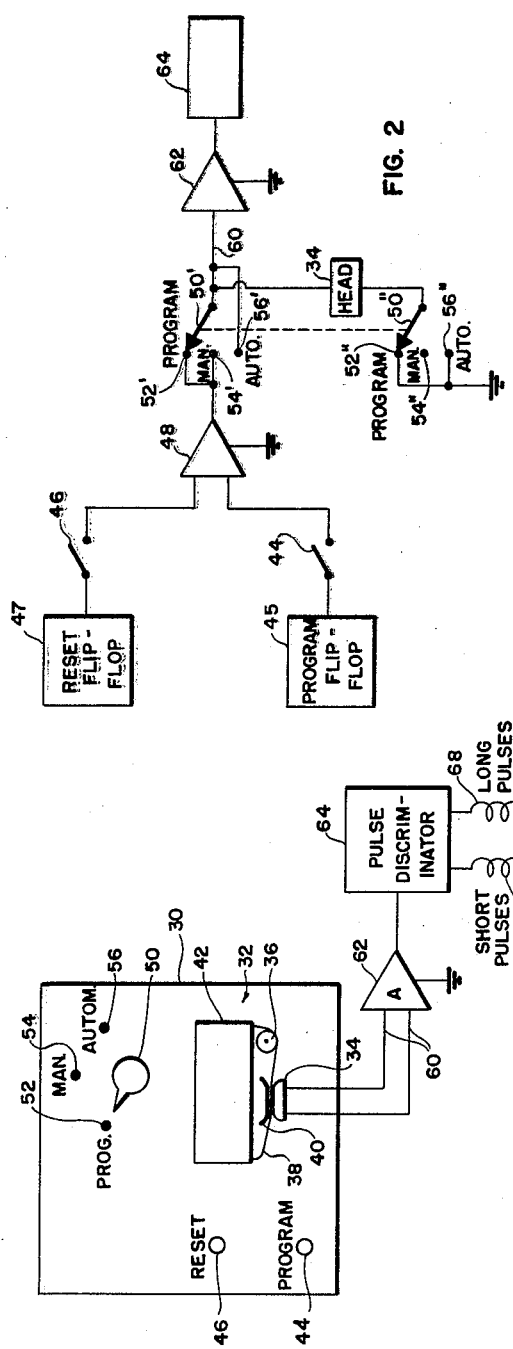
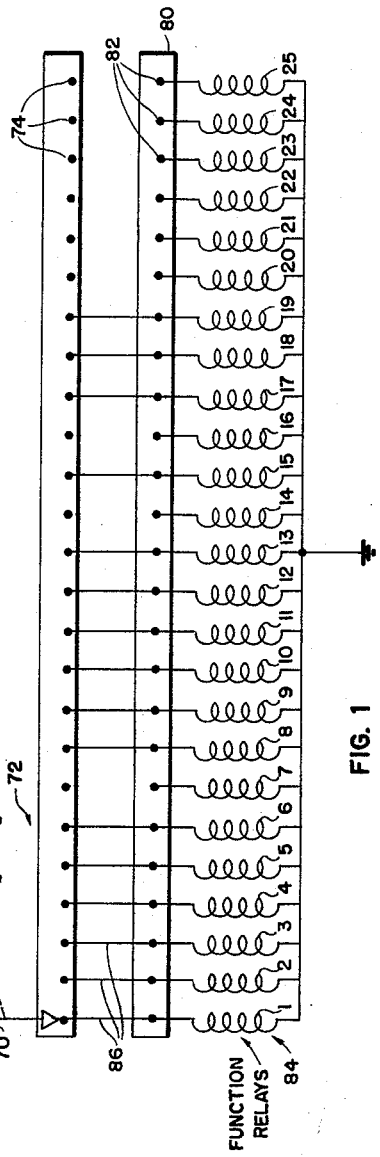
INVENTOR.
RALPH A. DORA
BY DONALD D. RICHARDS
Robert M. Taylor, Jr.
ATTORNEY

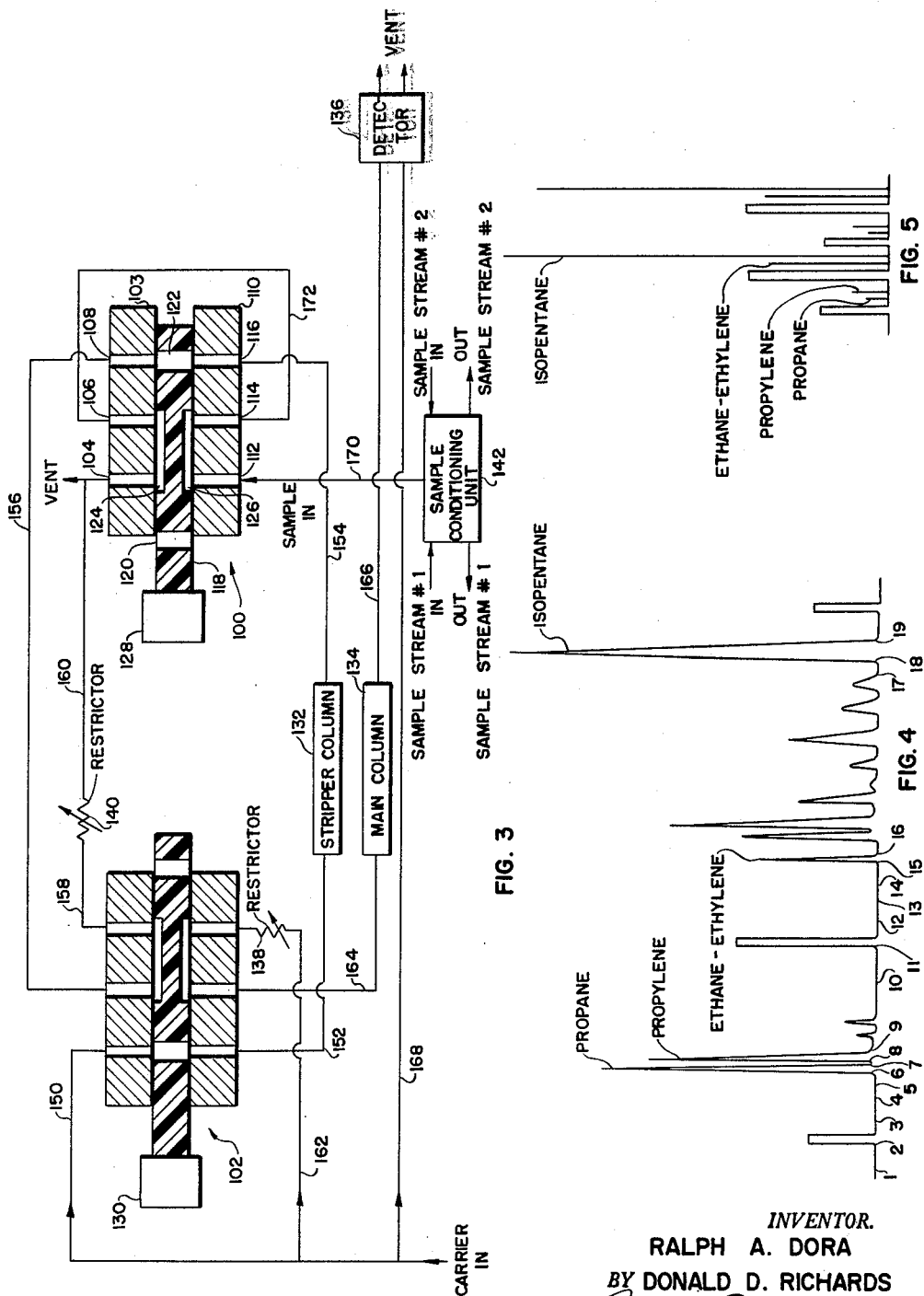

United States Patent Office 3,158,019
Patented Nov. 24, 1964

3,158,019
CHROMATOGRAPHIC ANALYZER
Ralph A. Dora, Anaheim, and Donald D. Richards, La Habra, Calif., assignors to Beckman Instruments, Inc., a corporation of California
Filed July 16, 1962, Ser. No. 210,123
2 Claims. (Cl. 73—23.1)

This invention relates to chromatographic apparatus and more particularly relates to an improved method and apparatus for controlling chromatographic analyses.

The number of applications in which chromatographic analysis has been utilized has increased greatly in recent years. This is particularly true in the process industries where gas chromatographs are used to monitor the components present in a process stream. Such uses have resulted in a demand for automated chromatographs that can be programmed to repeat a given operation over and over again. As a result of this demand, several proposals have been advanced for providing a programmer for a gas chromatograph.

One such proposal utilizes a series of cams mounted on a common shaft for controlling electrical switches which, in turn, control the various functions to be performed by the analyzer. While this type of programmer is satisfactory in actual operation, it is difficult to initially program and is single-purposed. To initially program such a programmer, the sample to be analyzed must be run through the chromatograph to obtain a chromatogram. This chromatogram must then be analyzed to determine the total time period for an analysis and the individual time intervals required to complete each phase of the analysis. Each individual interval must then be computed as a fraction or percentage of the total time period and the cam representing this function must then be cut or otherwise formed to close its associated switch for this time period. Obviously, much time is lost in making these computations and in setting the cams. In addition, any mistake that is made in the computations will require an entire new series of cam settings, resulting in further loss of time. Extraneous factors, such as temperature drift, may also cause the programmer to become inaccurate. If the temperature should change slightly, the elution time of one or more components may change slightly, resulting in the necessity of recomputing the entire cycle and resetting the cams.

Another proposal for a programmer envisions the use of a disc and a plurality of clips which may be fastened to the outer periphery of the disc to cooperate with an optical system for controlling the various functions. Here again, the various individual time intervals must be computed in terms of an accurate dimension and the clips mounted with extreme accuracy on the rim of the disc. While this system eliminates the necessity of forming and setting various cams, careful computations must still be made and painstaking accuracy employed in mounting the clips on the disc.

According to the present invention, it has been found that a gas chromatograph programmer can be provided which requires no computation for establishing the instant at which a given function is to commence or terminate and which may easily be corrected if one or more of the analysis parameters change. This improved operation is obtained by using a magnetic recording media to control a stepping switch whose contacts may be connected to any desired function controlling apparatus. In this manner the timing operation is separated from the function selecting operation, resulting in apparatus that is much more versatile than any previously known and which may easily be converted to perform any number of different analyses. The apparatus is extremely accurate and can be programmed rapidly by relatively unskilled personnel.

It is an object of the present invention to provide an electrical circuit for controlling a series of operations in a gas chromatograph in response to a time program established on a magnetic recording media and means to establish the program.

This and further objects and advantages of the invention will become more apparent upon reference to the following specification and claims and appended drawings wherein:

FIG. 1 is a schematic diagram of the circuitry of the present invention;

FIG. 2 is a schematic diagram of a portion of the controller shown in FIG. 1;

FIG. 3 is a schematic diagram of typical chromatographic apparatus which can be controlled by the present invention;

FIG. 4 is a chromatogram of a typical analysis performed by the apparatus of FIG. 3; and FIG. 5 is a bar graph representation of the chromatogram shown in FIG. 4 with the unwanted information removed.

Referring now to FIG. 1, there is shown a schematic diagram of the electrical circuitry of the present invention wherein the magnetic recording media is illustrated as magnetic tape. A controller 30 is provided with a tape deck of any well-known design, and generally indicated at 32. As shown, the tape deck consists of a read-write head 34, a driving pulley 36 for pulling magnetic tape 38 past the head 34, a bumper 40 for holding the tape against the head 34 and imparting a tension to the tape, and a tape storage unit 42. The construction of this tape deck is conventional and does not form part of the present invention. It should be understood that other magnetic recording or storage media such as wire, belts, drums, discs, etc., may be used in place of the tape 38, in which event an appropriate controller for this type media may be substituted for the controller shown.

The controller 30 is provided with two write buttons 44 and 46. Preferably, depression of the button 44 will cause the head 34 to impress a pulse of relatively short time duration on the tape 38 while depression of the button 46 will cause the head to impress a pulse of relatively long-time duration on the tape. For the sake of convenience, the button 44 will be referred to as the "program" button and the button 46 will be referred to as the "reset" button, although their respective functions could obviously be reversed. It should also be apparent that signals of different frequencies could be used instead of signals of different time duration if such is desired.

The controller 30 is also provided with a control switch 50 that can assume three positions. The first position, indicated at 52, may be referred to as the "program" position and corresponds to the "record" position on any standard tape recorder. The second position, indicated at 54, is labeled "manual" and serves to completely disable the recording head so that any signals present on the tape will have no effect. The third position, indicated at 56, is labeled "auto" and corresponds to the "playback" position on a standard magnetic recorder. As in the case of a standard recorder, any attempt to record will be ineffective when the control switch is turned to the auto position. It is thus apparent that control signals can be recorded only when the control switch 50 is in the program position.

The output of the head 34 is coupled through suitable conductors 60 to an amplifier 62. The output of the amplifier 62 is fed to a suitable pulse discriminating circuit 64 of any standard design suitable for separating short pulses from long pulses. The output of the pulse discriminator 64 controls two relay coils 66 and 68, the first of which becomes energized upon the appearance of a short pulse at the input of the discriminator and the second of which becomes energized upon the appearance of a long pulse at the input of the discriminator.

FIG. 2 shows a typical circuit which may be used in the controller 30. A pair of flip-flop circuits 45 and 47 produce output signals of different frequencies. These flip-flop circuits are connected to the input of a suitable amplifier 48, whose output is connected to both the "program" contact 52' and the "manual" contact 54' of one deck of the control switch 50. As shown, the switch 50 has two contact decks and two wipers which are mechanically interconnected. The wiper 50' of the upper deck is connected to the input of the amplifier 62 which, in turn, is coupled to the discriminator 64. The "auto" contact 56' is also connected to the input of the amplifier 62.

The magnetic read-write head 34 has one end connected to the wiper 50' of the upper deck of the switch and the other end connected to the wiper 50" of the lower deck of the switch. The "program" and "auto" contacts 52" and 56" of the lower deck are connected to ground while the "manual" contact 54" is electrically unconnected or floating.

As can be seen, when the switch 50 is in the "program" position, the output of the amplifier 48 is connected by the wiper 50' to both the amplifier 62 and the read-write head 34 so that if either switch 44 or 46 is closed, a signal will be recorded on the tape and will simultaneously cause the energization of one of the relay coils 66 or 68. If the switch 50 is in the "manual" position, any output signal from the amplifier 48 will be fed directly to the amplifier 62 but will not be recorded on the tape because the circuit of the head 34 is broken at the contact 54". If the switch 50 is in the "auto" position, the amplifier 48 is disconnected from the remainder of the circuit so that an attempt to record will be ineffective. Signals on the tape, however, will be sensed by the head 34 and passed to the amplifier 62 and discriminator 64 to energize relay coil 66 or 68, depending upon pulse duration.

The coils 66 and 68 control the movement of the wiper 70 of a stepping switch generally indicated at 72 in FIG. 1. The pulse discriminator 64 is so arranged that the appearance of a short pulse at its input causes the relay 66 to be energized once to cause the wiper at 70 to be stepped from one of the switch contacts 74 to the next adjacent contact. The appearance of a long or reset pulse at the input of the pulse discriminator 64 results in the coil 68 being energized sufficiently to return the wiper arm 70 to an initial position out of engagement with the contacts of the stepping switch. The wiper arm 70 is coupled to any suitable source of voltage 76 so that a potential is applied to whichever contact 74 is engaged by the arm 70.

A panel board 80 is provided with a plurality of contacts 82, preferably corresponding in number to the contacts 74 of the stepping switch 72. Each of the contacts 82 is coupled to ground through a suitable relay 84. Each of these relays 84 may be used to initiate any of the operations to be performed during an analysis. A plurality of connectors or jumpers 86 are provided for coupling the contacts 74 of the stepping switch 72 to the contacts 82 of the panel board 80. Thus, when the wiper arm 70 engages one of the contacts 74 which is connected to one of the relays 84 by a jumper 86, that relay will be energized and the operation which it controls will be initiated. It will be apparent to one skilled in the art that by suitably connecting the contacts 74 with the contacts 82 through the jumpers 86, any sequence of operations can be performed. Also, any function may be used repeatedly.

In operation, the operator first connects the contacts 74 and the contacts 82 with the jumpers 86 to establish the sequence of operations which is to occur during the analysis. The tape drive is then started and the operator can program the tape 38 as a chromatogram is being traced by depressing the program button 44 at times when the various operations of an analysis are to be initiated or terminated, as indicated by the chromatogram. This operation will be more fully explained hereinafter in connection with an actual analysis. In this manner, the instants of time at which an operation will be initiated and terminated are rendered completely independent of the nature of the operation itself. After all the program pulses have been recorded on the tape 38, the operator pushes the reset button 46 so that a reset signal is also recorded on the tape 38. The length of the program cycle may be determined either by initially knowing the total time period necessary to perform the entire analysis and forming a loop of tape of sufficient length, or by impressing the program on a standard tape and then cutting and splicing the tape to form a loop. It is, of course, obvious that the programming just discussed will take place while the control switch 50 is turned to the programming position.

After the program is established on the tape 38, the control switch 50 is turned to the auto position and the programmed tape 38 passed by the head 34 which now operates as a "read" head. As each short or program pulse is detected by the head 34 it is amplified and fed to the pulse discriminator 64 with the result that the coil 66 is energized and the wiper arm 70 caused to step one position. As it does so, the voltage is removed from one contact and impressed on the next adjoining contact. If the preceding contact was coupled by a jumper 86 to a relay 84, that relay is de-energized. If the next adjacent contact 74 is coupled by a jumper 86 to a relay 84, that relay is now energized and the operation which it controls is commenced. The wiper arm 70 will move from contact to contact, the dwell period being determined by the spacing between the pulses on the tape 38. When the head 34 senses a long or reset pulse, the wiper arm 70 will be returned to its initial position, thus setting up the programmer for a repetition of the entire cycle.

As may be seen from this description, the programmer is easily and accurately programmed, the time interval over which an operation continues and the nature of the operation itself being completely independent. Since the head 34 in its write or program position acts to erase signals on the tape other than the pulses resulting from a depression of the buttons 44 or 46, the time at which an operation occurs or its duration can easily be changed to compensate for differences in analysis parameters. The tape need only be run in the read or auto position until the pulse next preceding the pulse whose position is to be changed occurs. The control switch 50 is then switched to the program position and the old pulse is erased while a new, correctly positioned pulse is established in its place by depressing the program button 44. The sequence of operations may also be easily altered, or a number of them eliminated by merely rearranging or removing the jumpers 86.

The operation of the apparatus shown in FIG. 1 will now be described in connection with chromatographic apparatus used to control an actual analysis. In a refinery, it is desirable to continuously monitor and sometimes control the percentage of components present in various gas or liquid streams. For example, in the gas reclamation plant it is desirable to separate the useful hydrocarbons from the other waste gases in an absorber. By monitoring the absorber overhead, it can be determined that the conditions in the absorber, for example temperature and pressure, are such that the separation of hydrocarbons from the waste gases is at a maximum, and if not, that they should be altered.

Similarly, it is desired to remove various hydrocarbons from a flowing stream in the debutanizer. The presence or absence of maximum separation conditions in a debutanizer may be determined by monitoring the debutanizer overhead to detect the presence of hydrocarbons which are to be separated. The apparatus of the present invention will therefore be described in connection with a system for monitoring these two streams, in the first of which the amounts of propane and propylene present are to be determined, and in the second of which the amounts of ethane-ethylene and isopentane are to be determined.

Referring now to FIG. 3, there is shown a system for carrying out this analysis. In this system a sample valve generally indicated at 100 and a switching valve generally indicated at 102 are utilized to control the flow of carrier gas and sample through the various conduits and columns. The sampling valve 100 has a body portion including a first plate 103 having three passageways 104, 106 and 108 formed therein and a second plate 110 having three passageways 112, 114 and 116 formed therein, the passageways in the plate 103 being aligned with the corresponding passageways in the plate 110. A valve slider 118 has a pair of vertical passageways 120 and 122 and a pair of longitudinal passageways 124 and 126 formed therein. An actuator 128 of any suitable type is provided for moving the valve slide 118 from a first position in which the passageways 116, 122 and 108 are coupled for fluid flow; the passageways 114, 126 and 112 are coupled for fluid flow; and the passageways 106, 124 and 104 are coupled for fluid flow to a second position in which the passageways 112, 120 and 104 are coupled for fluid flow; the passageways 114, 126 and 116 are coupled for fluid flow; and the passageways 106, 124 and 108 are coupled for fluid flow. The switching valve 102 is similar in all respects to the valve 100 and therefore a separate description does not appear necessary. The switching valve 102 is provided with an actuator 130 which differs from the actuator 128 in a manner to be described presently. The system also includes a first chromatographic column 132, labeled as a "stripper" column, and a second chromatographic column 134, labeled as the "main" column, a detector 136 of any suitable type, for example a thermal conductivity detector, a pair of restrictors 138 and 140, and a sample conditioning unit 142 of conventional design.

When the valves 100 and 102 are positioned as shown, the system is in the reverse position. In this position carrier gas enters the valve 102 through a conduit 150, leaves the valve and is directed to the stripper column 132 by a conduit 152, enters the valve 100 by a conduit 154, leaves the valve 100 and enters the valve 102 through conduit 156, leaves the valve 102 and is directed to the restrictor 140 by a conduit 158, and is directed from the restrictor 140 to vent through a conduit 160. The carrier gas also is directed through a conduit 162 to the restrictor 138 and thence to the valve 102. It leaves the valve 102 and is directed to the main column 134 by a conduit 164. A conduit 166 couples the outlet of the main column 134 with one side of the detector 136. Carrier gas is also directed to the other side of the detector by means of a conduit 168. A sample stream, as selected from either sample stream 1 or sample stream 2 (corresponding to the absorber overhead and the debutanizer overhead) by the sample conditioning unit 142, is passed through a conduit 170 into the sample valve 100, out of the sample valve 100 into a sample loop 172, back into the sampling valve through the passage 106 and back out of the sample valve to vent by the passage 104.

When an analysis is to be made, the actuator 130 of the switching valve 102 is actuated to move the valve slider to the left-hand position, thereby placing the system in a forward position. The stream of carrier gas now enters the valve 102 by the conduit 150, leaves the valve 102 and is directed into the valve 100 by the conduit 156, leaves the valve 100 and is directed into the stripper column 132 by the conduit 154, enters the valve 102 by the conduit 152, leaves the valve 102 and enters the main column 134 by means of the conduit 164, and is directed to the detector 136 by the conduit 166.

The actuator 128 of the sampling valve 100 is now actuated to move the valve slider to the right-hand position. In this position the carrier gas entering the valve by the conduit 156 travels through the longitudinal passageway 124 in the valve slider and then travels through the sample loop 172 whereby a combined sample and carrier stream is formed. The stream re-enters the valve 100 through the passageway 114, leaves the valve through the passageways 126 and 116, and is directed into the stripper column 132 by the conduit 154. The combined stream then passes through the valve 102 and into the main column 134 as previously described. The effluent from the column 134 is passed to the detector 136 where the various components are detected.

The stripper column 132 serves to trap the components having long elution times while passing components having shorter elution times to the main column 134 where they are further separated. Once all the components of interest have passed into the main column 134, the actuator 130 of the valve 102 is actuated so that the system again resumes the reverse position and carrier gas passes through the stripper column 132 in a reverse or backflush direction, whereby the slower moving and noninteresting components are passed to vent while the components of interest are pushed through the main column 134 by the carrier gas flowing through the conduit 162, restrictor 138, valve 102 and conduit 164. The restrictors 138 and 140 are provided so that, when the respective columns are switched out of the system, the resistance to flow of carrier gas will remain constant.

It is obvious, of course, that the sample valve is maintained in its actuated position only long enough for the sample in the sample loop 172 to be incorporated in the stream of carrier gas. The slider is then returned to its deactuated position and the sample loop again fills with a sample, the sample being taken from either stream 1 or stream 2, depending on the sample conditioning unit 142.

The operation of the programmer shown in FIG. 1 in controlling the system shown in FIG. 3 will now be discussed with relation to the chromatogram shown in FIG. 4 which results from the analysis described above. This chromatogram may be obtained from a manually controlled analysis performed by the present apparatus with the control switch 50 set at the manual position, or from an analysis performed by another chromatographic analyzer, or in any other suitable fashion, and is used to determine when the analysis should be started and when the stripper column should be bypassed and backflushed. This is necessary as these times can not be determined from an observation of a chromatogram being traced. The contacts 74 are then connected to the contacts 82 by the jumpers 86 to establish the proper sequence of operations. The control switch is thereafter turned to the program position, the recorder drive initiated, and a signal representing the commencement of the first operation established on the tape. Since the program position of the switch 50 causes both a signal to be recorded and an energization of one of the relay coils 66 or 68, an analysis takes place and a chromatogram is produced as the program is recorded on the tape. By observing the chromatogram as it is being traced, the operator can visually determine the time at which an operation should be initiated or terminated. As each such time occurs, the program button 44 is depressed to establish a short pulse on the tape 38. The time of actuation and the holding time for the column switching valve must be determined from the manually obtained chromatogram. All other functions are initiated by observing the chromatogram as it is being traced. The operator continues to follow this procedure until all the necessary programming signals are established on the tape, at which time he depresses the reset button 46 to impress a long pulse on the tape 38. The programmer is now ready to control repetitiously the given analysis. All that need be done is to turn the control knob 50 to the auto position.

To perform the analysis described above, the chromatogram shown in FIG. 4 is referred to, and the relays 84 and jumpers 86 are arranged so that the below listed sequence of operations is followed. For the sake of convenience and clarity, the number assigned to the operation refers to the corresponding contact of the stepping switch 72 as the wiper arm 70 moves from left to right.
(1) Stripper column In
(2) Sample inject No. 1
(3) Stream No. 2
(4) Auto zero
(5) Stripper column out
(6) Component No. 1 attenuator In
(7) Blank
(8) Component No. 2 attenuator In
(9) Chart advance
(10) Stripper column In
(11) Sample injection No. 2
(12) Stream No. 1
(13) Auto zero
(14) Blank
(15) Component No. 3 attenuator In
(16) Blank
(17) Stripper column out
(18) Component No. 4 attenuator In
(19) Chart advance
Reset The control switch 50 is now turned to the program position and signals are impressed on the tape 38 as the chromatogram of FIG. 4 is being traced. The control switch is thereafter turned to the auto position and automatic analysis begun.

As it is desired to prevent any sample components from entering the main column prior to the inception of an analysis, the system of FIG. 3 is normally in the position shown. When the head 34 senses the first pulse on the tape 38, the coil 66 causes the wiper arm 70 to be moved from its initial position onto the first contact of the stepping switch 72. The coil coupled to this contact causes the actuator 130 to operate, moving the valve slider of the valve 102 to the left-hand position so that the stripper column and main column are connected in series relationship, as previously described. For the purposes of this description, it will be assumed that the sample conditioner 142 is causing the sample stream No. 1 to flow through the valve 100 and sample loop 172. The actuator 130 of the valve 102 should be of the type that dwells in either of two positions so that de-energization of the first coil will not cause it to reassume its original position while the actuator 128 should be of the type that returns to a rest position when its control coil is de-energized.

When the second program pulse is sensed, the wiper arm 70 moves to the next contact, de-energizing coil 1 and energizing coil 2. The energization of this coil causes the actuator 128 to operate, moving the slider 118 to the righthand position and injecting the sample in the sample loop 172 into the flowing carrier gas stream. Actuation of this coil will also cause the recorder pen to mark on the chart which sample is being analyzed in the well-known manner of chromatographic analyzers. Upon the occurrence of the next pulse, the wiper is moved to the third contact with the result that the valve slider 118 returns to its normal position. The coil 3 coupled with the third contact controls the sample conditioning unit 142 so that sample stream No. 1 will be shunted and sample stream No. 2 will pass through the sampling valve. The sample conditioning unit 142 is also a dual position device so that sample stream No. 2 will continue to flow through the sampling valve until the unit 142 receives another signal which returns it to its original position.

Upon the occurrence of the fourth pulse, the wiper arm moves to the next position and energizes coil 4 which controls the detector bridge circuit to establish an automatic zero in a manner well known to those skilled in the art. By this time, the components of interest have entered the main column 134, and the fifth pulse causes the coil 5 to be energized. This coil acts on the actuator 130 to cause the valve slider of the valve 102 to return to its right hand position so that the stripper column is taken out of connection with the main column and is backflushed in the manner described above.

Upon the occurrence of the sixth pulse, the coil 6 is energized and acts to couple a suitable signal attenuator into the detector circuit as will be understood by one skilled in the art. The amount of propane present in the sample will be determined by the detector 136 and a suitable trace made on the chart of a bar graph recorder as shown in FIG. 4. After the propane peak has passed, the seventh pulse will occur with the result that the wiper arm 70 will move to contact 7 of the stepping switch 72. This contact is not electrically coupled to any of the coils 84 and thus no positive operation occurs, merely the decoupling of coil 6 from the power supply.

Pulse 7 is closely followed by a pulse 8 which causes the coil 8 to be energized and which in turn causes a second component attenuator to be coupled in the detector circuit. The amount of propylene present in the sample is now determined and a second trace made on the chart of the bar graph recorder. The next pulse causes the coil 9 to be energized. Coil 9 controls the chart advance mechanism in the recorder. This independent chart advance regulates the spacing between successive analyses. This step completes the analysis of the first sample stream.

The analysis of the second sample stream is more or less a repetition of the analysis of the first sample stream. Upon the occurrence of the pulse 10, the wiper arm 70 is moved to contact 10 of the stepping switch with the result that the coil 10 is energized. This coil controls the actuator 130 of valve 102 and causes the valve slider to be moved to the left-hand position. As was previously the case, the carrier gas now flows through the stripper column and main column in a series relationship. The sensing of pulse 11 causes the coil 11 to be energized with the result that the actuator 128 operates to move the valve slider of the valve 100 to the right-hand position so that the sample from the second stream is injected into the system. Energization of coil 11 also causes the recorded pen to indicate on the chart that the second sample is being analyzed. The occurrence of pulse 12 causes the wiper arm 70 to be moved from contact 11 to contact 12 with the result that the actuator 128 is deactivated and the slider returns to its left-hand position. When the wiper arm reaches the contact 12, the coil 12 is energized and causes the sample conditioning unit 142 to shunt sample stream No. 2 and re-establish the flow of sample stream No. 1 through the sampling valve 100.

The pulse 13 acts to energize the coil 13 which controls the detector circuitry in the same manner as it did in coil 4 so that an automatic zero is again set. The next pulse moves the wiper arm 70 to contact 14 which is a blank contact. The utilization of this blank contact de-energizes all functions until such time as it is necessary for the next operation which is the insertion of component attenuator No. 3 into the detector circuitry. This operation is initiated by the head 34 sensing the fifteenth pulse on the tape 38. The amount of ethane-ethylene present in sample stream No. 2 is now determined and a trace made on the bar graph chart as shown in FIG. 5.

After the ethane-ethylene peak has passed, the sixteenth pulse is detected by the head 34 and causes the wiper arm to move to the sixteenth contact which is also a blank contact. The wiper arm will remain on this contact, thus preventing any further operations from occurring, until the last component of interest has entered the main column 134. At this time, the pulse 17 will occur causing the coil 17 to be energized, with the result that the actuator 130 will operate to move the valve slider to its right-hand or normal position and the stripper column will be backflushed as previously explained. The occurrence of pulse 18 causes the relay 18 to be energized to couple another suitable component attenuator into the detector circuit. The amount of isopentane present in the sample stream is now measured by the detector 136 and a trace made on the chart of the bar graph recorder as shown in FIG. 5.

After the isopentane peak has passed, the nineteenth pulse occurs, causing coil 19 to be energized. This coil, like coil 9, activates the chart advance mechanism of the recorder so that adequate spacing is maintained between each analysis. The next signal that is detected by the head 34 is the reset pulse. This pulse causes the energization of coil 68 with the result that the wiper arm 70 is stepped through the remaining contacts of the stepping switch back to its initial position which, as illustrated, is immediately preceding the first contact. The apparatus is now ready for another analysis which will occur as soon as the head detects the first program pulse on the tape being passed across it.

As can be seen from the foregoing description, the present invention provides a programmer for a chromatographic analyzer which enables it to accurately repeat a given analysis over and over. The program may easily be established by a relatively unskilled person. It requires no tedious computations and setting of cams or the like. It is thus considerably more rapid and there is less likelihood of making mistakes. Although a specific example is given, this example is merely illustrative and not restrictive. It is obvious that the method and apparatus embodied in the present invention could be used to control any given column configuration or system to perform any analysis of which it is capable.

Various other changes could also be made within the scope of the invention. For example, different frequency signals could be established on the tape 38 rather than pulses of different time duration. A single controller could also be used to control a plurality of stepping switches by providing a plural track head or by using a plurality of signals of different frequencies and a plurality of frequency selective amplifiers or pulse discriminators to control the proper stepping switch in response to the different signals, and thereby control a number of different analyses. A magnetic media and suitable controller other than that illustrated could be used, if desired.

The apparatus and method disclosed permits the separation of the selecting and sequencing of operations from the control of the time at which they are to be performed and thus results in a much more versatile instrument than has heretofore been provided. This versatility also enables corrections or changes to be made in the program simply and easily and without the necessity of dismantling the entire apparatus or interfering with the analysis in any other way.

The invention may be embodied in other specific forms not departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. In a chromatograph analyzer capable of performing multiple operations and having a plurality of means energizable to initiate the performance of said operations, the combination comprising:
   a controller, said controller including a magnetic recording media, a read-write transducer, drive means for driving said media past said transducer, means for selectively establishing said transducer in a write or read state, said transducer being operable in its write state to record information on said media and operable in its read state to produce output signals in response to information stored on said media;
   means for establishing a select sequence in which said energizable means are energizable; and
   means coupled to said transducer responsive to said output signals and responsive to the information being recorded on said media when said transducer is being operated in its write state for energizing said energizable means in the sequence selected.

2. In a chromatographic analyzer capable of performing multiple operations, the combination comprising:
   a controller, said controller including a magnetic recording media having two types of information stored thereon, a read-write transducer and drive means for driving said media past said transducer, said transducer being operable in its read state to produce first and second output signals in response to said information on said media;
   a stepping switch including a plurality of contacts and a moveable wiper arm having an initial position;
   means coupled to said transducer responsive to said first output signals for moving said wiper arm from one contact to the next contact, responsive to said second output signal for returning said wiper arm to its initial position, and similarly responsive to information being recorded on said media when said transducer is being operated in its write state to record said first and second output signals;
   a plurality of relays, each of said relays energizable to control at least one of said operations of said analyzer;
   means for coupling the contacts of said stepping switch to said relays to establish the sequence in which said relays are coupled to said wiper arm as said wiper arm moves from contact to contact in response to said output signals; and
   means for connecting said relays to a source of power for energizing each of said relays when it is coupled to said wiper arm whereby said operations are performed in said selected sequence.

References Cited in the file of this patent

UNITED STATES PATENTS

| | | |
|---|---|---|
| 2,362,827 | Joachim | Nov. 14, 1944 |
| 2,968,746 | Flan et al. | Jan. 17, 1961 |
| 2,987,711 | Palmer | June 6, 1961 |
| 3,023,605 | Burk | Mar. 6, 1962 |
| 3,049,909 | Thomas | Aug. 21, 1962 |
| 3,068,685 | Rogers | Dec. 18, 1962 |
| 3,096,507 | Harms et al. | July 2, 1963 |
| 3,099,154 | Vanderbilt | July 30, 1963 |